United States Patent [19]
Rahn

[11] 3,737,692
[45] June 5, 1973

[54] HORIZONTALLY OMNIDIRECTIONAL ELECTROMAGNETIC SENSOR

[75] Inventor: Ralph A. Rahn, Cudahy, Wis.

[73] Assignee: General Motors Corporation, Detroit, Mich.

[22] Filed: Jan. 7, 1972

[21] Appl. No.: 216,073

[52] U.S. Cl. ................................... 310/15, 340/17
[51] Int. Cl. ............................................. H02k 35/00
[58] Field of Search .................. 340/52 R, 52 H, 61, 340/17; 73/514, 71.2, 71.1; 310/15, 25

[56] References Cited
UNITED STATES PATENTS

| | | | |
|---|---|---|---|
| 3,270,218 | 8/1966 | Barta | 310/15 X |
| 3,287,696 | 11/1966 | Cholet et al. | 340/17 |
| 3,371,311 | 2/1968 | Cholet et al. | 340/17 |
| 3,626,364 | 12/1971 | Simon et al. | 340/17 |

Primary Examiner—D. F. Duggan
Attorney—W. E. Finken and Herbert Furman

[57] ABSTRACT

An omnidirectional sensor which converts planar movement of a seismic mass into an electrical impulse by electromagnetic induction. The seismic mass is a hollow cylinder having the lower edge thereof slidable on a horizontal planar apertured surface of a support. A stop member extends through the mass and aperture and limits movement of the mass along the surface under an acceleration pulse of predetermined amplitude and time.

9 Claims, 6 Drawing Figures

3,737,692

HORIZONTALLY OMNIDIRECTIONAL ELECTROMAGNETIC SENSOR

This invention relates generally to planar omnidirectional sensors and more particularly to such sensors wherein planar movement of a seismic mass under an acceleration pulse of predetermined amplitude and time is converted into an electrical impulse by means of electromagnetic induction.

One of the features of this invention is that the seismic mass is normally located against movement relative to a planar surface by a movable keeper means which is normally located against movement by magnetic positioning means. Another feature of this invention is that movement of the keeper means generates an electrical impulse by electromagnetic induction. A further feature of this invention is that the seismic mass and the keeper means move generally normal to each other and include interengaging conical surfaces which normally preclude movement of the mass independent of the keeper means unless the mass is subjected to an acceleration pulse of predetermined amplitude and time sufficient to simultaneously move the keeper means through the interengaging conical surfaces against the force of the magnetic positioning means. Yet another feature is that the keeper means includes a pole piece separated from a pick-off coil by an air gap so that any effective magnetic linkages between the pole piece and the coil are insufficient to generate an electrical impulse by electromagnetic induction when the seismic mass and keeper means are located against movement by the magnetic positioning means. Yet a further feature of this invention is that the seismic mass and keeper means include hollow cylindrical members which are telescopically related to each other and include the interengaging conical surfaces adjacent terminal edges thereof. Still another feature of this invention is that the planar surface is provided by a planar member, the interengaging conical surfaces of the seismic mass and keeper means camming the keeper means generally normal to the member within an aperture thereof upon movement of the seismic mass along the planar surface under the required acceleration pulse. Still a further feature of this invention is that the keeper means includes a threshold magnet providing the magnetic positioning means and movable with the keeper means as a unit upon movement of the keeper means, the threshold magnet normally locating the keeper means against movement by the attraction thereof to a magnet rest.

These and other features of the sensor of this invention will be readily apparent from the following specification and drawings wherein:

FIG. 1 is a partial sectional view of a sensor according to this invention in unactuated condition;

Figure 2:
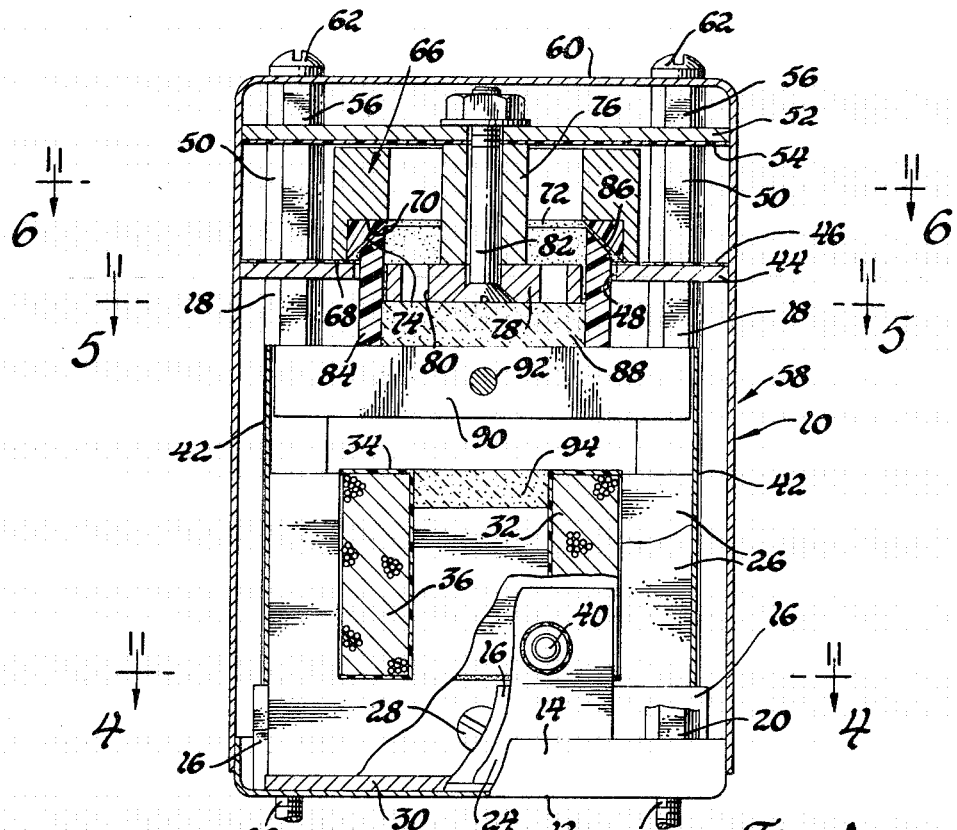
FIG. 2 is a view of a portion of FIG. 1 showing the sensor in actuated condition.
Figure 2:
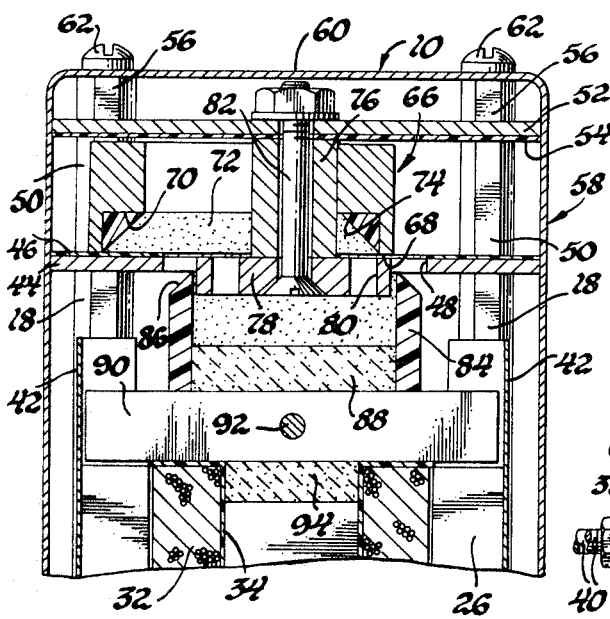
Figure 3:
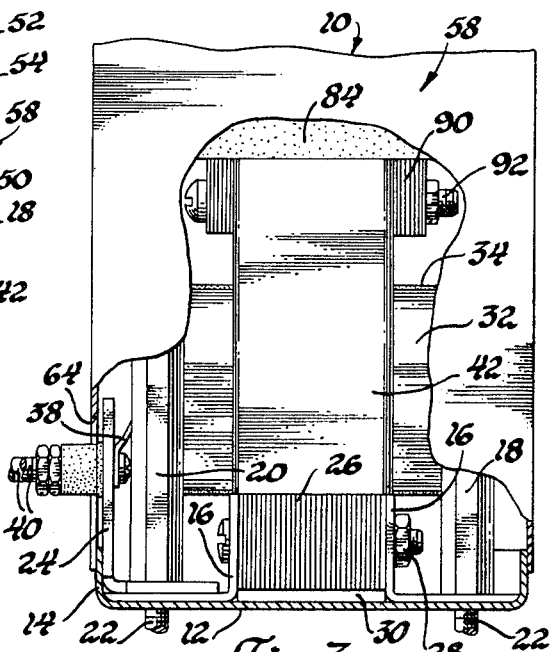
FIG. 3 is a partially broken away side elevational view of the sensor.
Figure 4:
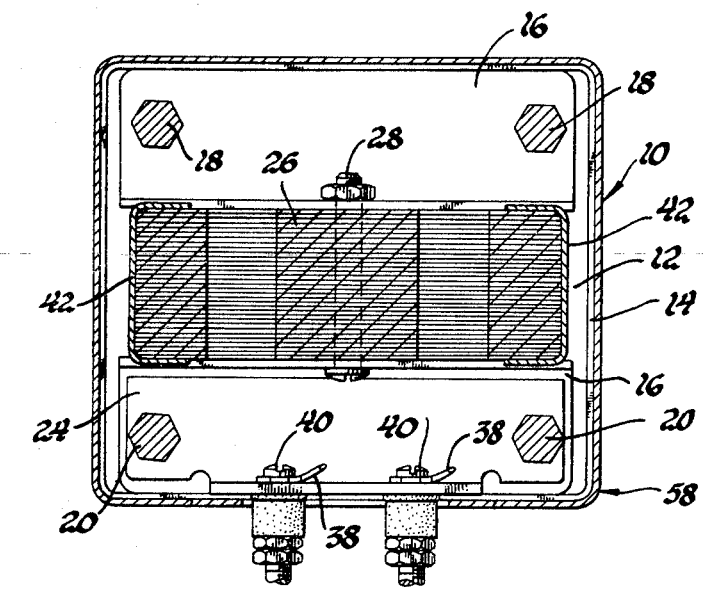
FIG. 4 is an enlarged sectional view taken generally along the plane indicated by line 4—4 of FIG. 1.

Referring now particularly to FIGS. 1, 3, and 4 of the drawings, a sensor 10 according to this invention includes a rectangular base 12 having an upwardly extending continuous lateral flange 14. A pair of angle brackets 16 seat on the base 12 and seat the lower ends of respective pairs of hexagonal posts 18 and 20. The brackets and posts are secured to the base by threaded members 22 which are threadedly received within openings in the base and extend through apertures in the brackets 16 into threaded bores in the lower ends of the posts. Members 22 provide for mounting of the sensor 10 as will be described. The posts 20 are slightly shorter than the posts 18 due to the presence of an intervening angle bracket 24 which seats on the one bracket 16 for a purpose to be described.

A magnetic frame 26 is comprised of a number of thin laminated metal plates of E shape, FIG. 1, which are bolted together by a bolt 28, FIG. 4, which extends through the plates and through the upwardly extending legs of the angle brackets 16. A spacer plate 30 fits underneath the magnetic frame to locate this frame relative to the base 12.

A pick-off coil 32 includes a plastic spool 34 wound with a number of turns of wire 36. The pick-off coil is received on the middle leg of the magnetic frame and the ends 38 of the wire 36 are secured to conventional contact posts 40 which are mounted on and conventionally insulated from the upwardly extending leg of the bracket 24.

Figure 5:
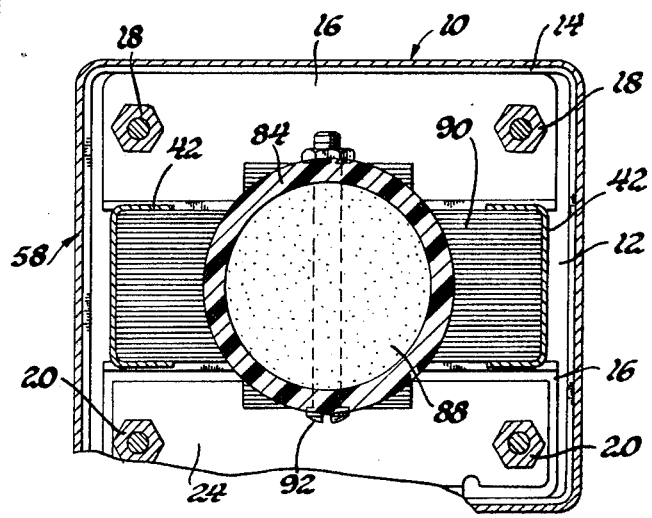
FIG. 5 is an enlarged sectional view taken generally along the plane indicated by line 5—5 of FIG. 1.

A channel member guide 42, FIG. 5, is adhesively or otherwise secured to each outboard leg of the magnetic frame as best shown in FIGS. 1 and 5.

The upper ends of the posts 18 and 20 support a generally rectangularly shaped intermediate plate 44 having the upper surface thereof covered with a suitable low friction plastic 46 such as nylon or Teflon. Plate 44 is provided with a circular central aperture 48. Short posts 50 extend upwardly from the upper surface of plate 44 and are secured to respective posts 18 and 20 in any suitable manner, such as by threaded members extending into threaded bores in each pair of aligned posts through suitable apertures in the plate. An upper rectangularly shaped plate 52 seats on the upper ends of the posts 50 and is likewise covered with suitable low friction plastic 54. Upper posts 56 seat on the upper surface of the plate 54 and are joined to the posts 50 in the same manner as the latter are joined to posts 18 and 20. A rectangularly shaped cover member 58 includes an upper wall 60 which seats on the posts 56 and is secured to at least two of these posts by bolts 62 which extend into tapped openings in such posts. The cover member covers the entire sensor and the lower edge thereof overlaps the flange 14 of base 12. As shown in FIG. 3, the cover member is suitably cut out at 64 to provide egress of the posts 40.

Figure 6:
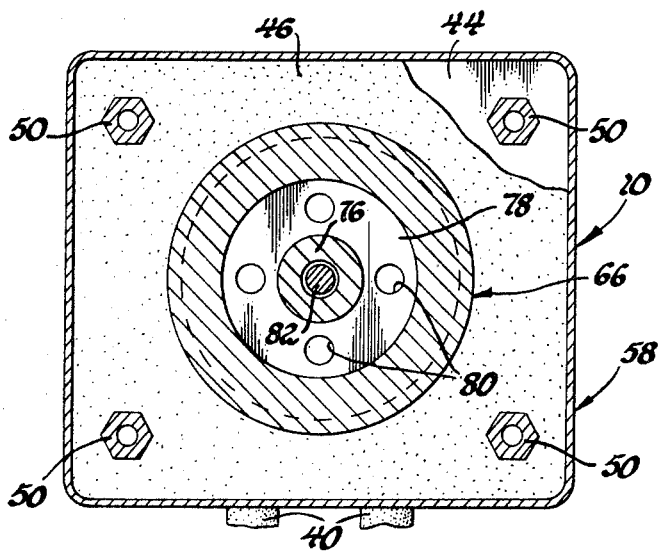
FIG. 6 is an enlarged sectional view taken generally along the plane indicated by line 6—6 of FIG. 1.

A hollow cylindrical seismic mass 66 includes a lower edge 68 which is slidable on the surface 46 of plate 44 and an upper edge which is closely spaced from surface 54 of plate 52 so that the mass can move horizontally but not vertically. The edge 68 joins to an internal counterbore 70 which receives a cylindrical ring 72 of suitable low friction plastic having a conical surface 74. A stop post 76 extends from plate 52 through the mass 66 and seats against a cylindrical magnet rest 78 which is provided with a number of apertures 80, see FIG. 6. A bolt 82 extends through the rest, the post, and a suitable aperture in plate 52 and is secured to the latter to mount the post and rest in fixed position on the sensor and locate the rest within aperture 48 and below the plane of surface 46.

A keeper means includes a cylindrical keeper ring 84 of suitable low friction plastic which surrounds rest 78 and extends through the aperture 48 of the plate 44. Ring 84 includes an upper conical surface 86 which is juxtaposed to the surface 74 of the seismic mass. A threshold magnet 88 is received within and secured to the keeper ring adjacent the lower edge thereof. The magnet and lower edge of the keeper ring are adhesively or otherwise secured to the upper surface of a pole piece 90 which is comprised of a number of thin strips of metal adhesively laminated to each other as well as being bolted to each other at 92 as shown in FIGS. 1, 3, and 5. The opposite ends of the pole piece 90 are slidably received within the guides 42 as shown in FIG. 5 so that the keeper means, including the pole piece, keeper ring and magnet are guided as a unit for vertical movement generally normal to the plate 44.

When the sensor 10 is in unactuated condition as shown in FIG. 1, the magnetic attraction of the threshold magnet 88 to the magnet rest 78 locates the pole piece and keeper ring as shown with the conical surface 86 of the keeper ring juxtaposed to the conical surface 74 of the mass. This locates the seismic mass against movement with respect to the surface 46 unless the magnetic attraction of magnet 88 to rest 78 is overcome. The spacing of the pole piece 90 from a permanent magnet 94 located within the pick-off coil and secured to the center leg of the magnetic frame provides an air gap such that there are insufficient flux linkages across this air gap and then back through the pick-off coil 32 to induce a voltage in the pick-off coil.

When the mass 66 is subjected to an acceleration pulse of predetermined amplitude and time, the mass 66 will slide or move horizontally along the surface 46 of the plate 44. The engagement of the conical surface 74 of the mass with the conical surface 86 of the keeper ring 84 will cam the keeper ring, the magnet 88 and the pole piece 90 downwardly against the magnetic attraction between the magnet 88 and the magnet rest 78. As the air gap between the pole piece 90 and the magnet 94 suddenly decreases, the flux linkages passing between them and back through the magnetic frame 26 and the coil 32 induce a voltage in this coil which can be measured across the posts 40.

The sensor 10 is particularly intended for use in a conventional vehicle body occupant restraint system wherein a source of pressure fluid is connected to an inflatable occupant restraint cushion by means of a suitable manifold and/or diffuser which is normally blocked from the source by a diaphragm which is ruptured by electrically fired means. The induced voltage from the pick-off coil can be used to initiate actuation of the electrically fired means to thereby rupture the diaphragm and inflate the cushion. Alternatively, such systems may conventionally include a gas generator which is electrically ignitable to cause the burning of chemical propellant and thereby generate pressure fluid. In such instances the electrical ignition of the gas generator can be initiated by the induced voltage from the pick-off coil.

The action of the threshold magnet 84 establishes an impulse level below which the sensor 10 cannot be actuated since the force exerted by the seismic mass will be insufficient to force the keeper ring 86, the threshold magnet, and pole piece downwardly to decrease the air gap. Additionally, the threshold magnet provides an integrating distance for very short duration high level pulses received by the seismic mass.

It will also be noted that the seismic mass 66 can move in any direction in a horizontal plane defined by the plate 44. Thus the sensor is omnidirectional with respect to pulses directed in a horizontal plane or generally parallel to such plane. The engagement of the inner surface of the seismic mass with the post 76 provides a limit stop for movement of the mass. The movement of the seismic mass is, of course, dependent upon a pulse being received thereby which is greater than the force of the matnetic attraction between the threshold magnet 88 and the magnet rest 78.

It will be understood that the sensor 10 will be mounted on the vehicle in such manner that the acceleration pulses which result from impact of the vehicle with an obstacle will be applied to the sensor in a generally horizontal plane or generally parallel to the surface of the plastic 46. Although the sensor 10 is particularly intended for use in vehicle occupant restraint systems, it may have other uses.

Thus, this invention provides an improved omnidirectional electromagnetic sensor.

I claim:

1. A sensor comprising, in combination, a support including a planar wall, an annular seismic mass slidably mounted on the wall and including an annular conical surface, annular keeper means including an annular conical surface, means mounting the keeper means on the support for movement normal to the wall, means magnetically locating the keeper means relative to the wall in an unactuated position wherein the conical surface of the keeper means is located in adjacent juxtaposed position to the seismic mass conical surface to thereby locate both the keeper means and the seismic mass against respective movement, an acceleration pulse of predetermined amplitude and time applied to the seismic mass in a plane generally parallel to the wall moving the seismic mass relative thereto and moving the keeper means normal to the wall against the force of the magnetic locating means through the camming action of the conical surfaces, and means responsive to movement of the keeper means normal to the wall for generating an electrical impulse by electromagnetic induction.

2. A sensor comprising, in combination, a support including an apertured planar wall, an annular seismic mass slidably mounted on the wall and including an annular conical surface, annular keeper means received within the wall aperture and including an annular conical surface, means mounting the keeper means on the support for movement normal to the wall within the aperture thereof, means magnetically locating the keeper means relative to the wall in an unactuated position wherein the conical surface of the keeper means is located in adjacent juxtaposed position to the seismic mass conical surface to thereby locate both the keeper means and the seismic mass against respective movement, an acceleration pulse of predetermined amplitude and time applied to the seismic mass in a plane generally parallel to the wall moving the seismic mass relative thereto and moving the keeper means normal to the wall against the force of the magnetic locating means, and means responsive to movement of the keeper means normal to the wall for generating an electrical impulse by electromagnetic induction.

3. A sensor comprising, in combination, a support including an apertured planar wall, a hollow annular seismic mass slidably mounted on the wall and including a continuous conical surface, stop means mounted on the support and extending through the seismic mass to limit the extent of movement thereof relative to the wall, hollow annular keeper means received within the wall aperture and including a continuous conical surface, means mounting the keeper means on the support for movement normal to the wall within the aperture thereof, means providing a magnetic force between the stop means and keeper means to locate the keeper means in an unactuated position wherein the conical surface thereof is located in adjacent juxtaposed position to the seismic mass conical surface to thereby preclude movement of the seismic mass independent of the keeper means, an acceleration pulse of predetermined amplitude and time applied to the seismic mass in the general plane of the wall moving the seismic mass relative to the wall into engagement with the stop means, the engagement of the seismic mass conical surface with the keeper means conical surface camming the keeper means to actuated position relative to the wall against the magnetic force, and means responsive to movement of the keeper means to actuated position for generating an electrical impulse by electromagnetic induction.

4. A sensor comprising, in combination, a support including an apertured planar wall, a hollow annular seismic mass slidably mounted on the wall and including a continuous conical surface, annular keeper means received within the wall aperture and including a continuous conical surface, magnetic means providing a magnetic force between the support and keeper means locating the keeper means in an unactuated position wherein the conical surface of the keeper means is located in adjacent juxtaposed position to the seismic mass conical surface to thereby preclude movement of the seismic mass independent of the keeper means, means guiding movement of the keeper means normal to the wall within the aperture thereof to actuated position, an acceleration pulse of predetermined amplitude and time applied to the seismic mass in the general plane of the wall moving the seismic mass relative to the wall, the camming engagement of the juxtaposed conical surfaces moving the keeper means to actuated position, and means including a pole piece on the keeper means and a fixed magnet on the support for generating an electrical impulse by electromagnetic induction upon movement of the keeper means to actuated position.

5. A sensor comprising, in combination, a support including a planar wall, a cylindrical seismic mass slidably mounted on the wall and including a continuous conical surface generated about the axis thereof, a cylindrical keeper ring including a continuous conical surface generated about the axis thereof, stop means extending coaxial of the mass and engageable by the mass to limit sliding movement thereof relative to the wall, threshold magnet means mounted on the keeper ring and seating against the stop means to locate the keeper ring in an unactuated position wherein the conical surface of the keeper ring is coaxial with the conical surface of the seismic mass to preclude movement of the seismic mass independent of movement of the keeper ring, an acceleration pulse of predetermined amplitude and time applied to the seismic mass in the general plane of movement thereof moving the seismic mass relative to such plane and moving the keeper ring against the attraction between the magnet means and the stop means, and means responsive to movement of the keeper ring for generating an electrical impulse by electromagnetic induction.

6. A sensor as recited in claim 5 wherein the means responsive to movement of the keeper ring includes a pole piece mounted on the keeper ring for movement therewith and a magnet and pick-off coil mounted on the support, the pole piece being spaced from the magnet and pick-off coil by an air gap when the magnet means locates the keeper ring in unactuated position.

7. A sensor as recited in claim 5 wherein the means responsive to movement of the keeper ring includes a pole piece mounted on the keeper ring for movement therewith relative to a magnet and pick-off coil mounted on the support by a magnetic frame, and guide means mounted on the frame and guiding movement of the keeper ring and pole piece, the pole piece being normally spaced from the magnet and pick-off coil by an air gap when the keeper ring is in unactuated position, movement of the keeper ring closing the air gap and generating an electrical impulse in the pick-off coil by magnetic linkages between the pole piece and magnet through the coil and frame.

8. The combination recited in claim 5 wherein the support includes a second planar wall located in generally parallel spaced relationship to the first planar wall and cooperatively constraining the seismic mass against movement normal to the walls.

9. The combination recited in claim 5 wherein the support includes a second planar wall located in generally parallel spaced relationship to the first planar wall and cooperatively constraining the seismic mass against movement normal to the walls, the walls being covered with a low friction material to provide for ease of movement of the mass relative thereto, the means responsive to movement of the keeper ring including a pole piece secured to the keeper ring for movement therewith as a unit relative to a magnet and pick-off coil mounted on a magnetic frame secured to the support, the keeper ring normally spacing the pole piece from the magnet and pick-off coil by an air gap when the keeper ring is in unactuated position, the magnetic frame including guide means guiding movement of the pole piece, keeper ring and threshold magnet means as a unit relative thereto and against the action of the threshold magnet means to decrease the air gap to a minimum and induce a voltage in the pick-off coil providing an actuating signal.

* * * * *